(12) United States Patent
Brej

(10) Patent No.: US 7,445,120 B2
(45) Date of Patent: Nov. 4, 2008

(54) FOLDING REUSABLE DISPLAY AND ARTICLE STORAGE PACKAGE

(75) Inventor: Thaddeus Brej, Parma Heights, OH (US)

(73) Assignee: Cequent Consumer Products, Solon, OH (US)

( * ) Notice: Subject to any disclaimer, the term of this patent is extended or adjusted under 35 U.S.C. 154(b) by 244 days.

(21) Appl. No.: 11/126,507

(22) Filed: May 11, 2005

(65) Prior Publication Data

US 2005/0252829 A1 Nov. 17, 2005

Related U.S. Application Data

(60) Provisional application No. 60/570,246, filed on May 12, 2004.

(51) Int. Cl.
*B65D 79/00* (2006.01)
*B65D 6/28* (2006.01)
*B65D 43/16* (2006.01)

(52) U.S. Cl. .................. 206/747; 206/471; 206/746; 206/806; 220/4.23; 220/4.24; 220/832

(58) Field of Classification Search ............. 206/736, 206/461, 463, 470–472, 478–483, 806, 745–749; 220/4.22–4.24, 831–832, 839
See application file for complete search history.

(56) References Cited

U.S. PATENT DOCUMENTS

| | | | | |
|---|---|---|---|---|
| 2,998,899 A | | 9/1961 | Telesca | |
| 3,221,919 A | * | 12/1965 | Gessner | 220/832 |
| 3,240,375 A | * | 3/1966 | Burrows | 220/832 |
| 3,359,873 A | | 12/1967 | Carle et al. | |
| 3,474,949 A | | 10/1969 | Shine | |
| 3,498,523 A | | 3/1970 | Stembridge et al. | |
| 3,504,787 A | * | 4/1970 | Brockway | 206/480 |
| 3,606,919 A | * | 9/1971 | Joerger et al. | 220/4.23 |
| 3,643,650 A | * | 2/1972 | Elder | 220/4.23 |
| 3,698,544 A | * | 10/1972 | Growney | 206/747 |
| 4,193,495 A | | 3/1980 | Keeley | |
| 4,423,811 A | * | 1/1984 | Knapp | 220/4.23 |

(Continued)

FOREIGN PATENT DOCUMENTS

EP 0375925 A2 * 7/1990

OTHER PUBLICATIONS

Ratchet & Spring Clamp Tiedown Interactive & Storaage Packaging.

*Primary Examiner*—Byron P Gehman
(74) *Attorney, Agent, or Firm*—McDonald Hopkins LLC; Robert H. Earp, III; David J. Smith

(57) ABSTRACT

A reusable display package having a first body with a first pocket and a second body with a second pocket is provided. A hinge connects the first body to the second body to move the first body relative to the second body from an open display position to a closed carrying position. At the open display position, the first body and the second body are coplanar and the packaging is capable of displaying products. At the closed carrying position, the first body is substantially parallel to the second body. Retaining members lock the hinge at the open display position and are removable for moving the bodies to the closed carrying position.

18 Claims, 4 Drawing Sheets

U.S. PATENT DOCUMENTS

| | | | | |
|---|---|---|---|---|
| 4,523,702 A | * | 6/1985 | Viio | 206/479 |
| 4,643,316 A | * | 2/1987 | Hoffmann | 206/373 |
| 4,779,914 A | | 10/1988 | Friedline | |
| 5,104,054 A | * | 4/1992 | Latham | 206/470 |
| 5,121,835 A | * | 6/1992 | Grupe | 206/471 |
| 5,154,467 A | | 10/1992 | Lanius et al. | |
| 5,259,498 A | | 11/1993 | Weisburn et al. | |
| D406,525 S | | 3/1999 | Peng | |
| 5,884,767 A | | 3/1999 | Peng | |
| 6,041,918 A | | 3/2000 | Moore | |
| 6,129,229 A | * | 10/2000 | Dunn et al. | 220/4.22 |
| 6,161,693 A | | 12/2000 | Findle et al. | |
| 6,619,482 B1 | * | 9/2003 | King | 206/747 |
| 6,913,143 B2 | * | 7/2005 | Yang | 220/832 |

\* cited by examiner

FOLDING REUSABLE DISPLAY AND ARTICLE STORAGE PACKAGE

CROSS-REFERENCE TO RELATED APPLICATIONS

This application claims priority from U.S. Provisional Patent Application No. 60/570,246 filed on May 12, 2004, which is hereby incorporated by reference.

FIELD OF INVENTION

The present invention relates generally to a reusable display package, and more particularly, to a foldable-reusable display package that can be converted into an article carrier.

BACKGROUND

In today's ever increasingly competitive markets for the sale of products, packaging used at the point-of-sale has become more important. Providing a package that not only can be used to display the product, but can also be reused as a carrier has been used a means to increase sales. Doing so adds value to the product and can differentiate it over other competitive products not having such packaging. Such reusable packaging can make a product that is basically indistinguishable from other similar products a better seller over such other products.

Most products are displayed at a point-of-sale in a non-reusable package that is thrown away by the purchaser. This adds to the problem of the overburden garbage system. So many of today's products sold are over packaged. The packaging is merely thrown away by the purchaser. It provides no utility to the purchaser after the purchase and has become wasteful.

On the other hand, some sellers attempt to provide packaging that is reusable for a purpose unrelated to the product purchased. For example, many food products come in tubs or other similar packages that are reusable as storage devices for other items. More specifically, such tubs make excellent storage devices for small items such as nails, tacks, paperclips, etc. However, these tubs do not provide a use related to the product sold.

Still further, some products are sold with packaging that is reusable and related to the product purchased. However, many of these reusable packaging devices are not very suitable for the additional use. They are often flimsy and have a very short useful life, or are just not very capable of such intended secondary use. Therefore, there is a need for a display package that is not only reusable, but also sturdy and useful for its intended purpose. More specifically, there is a need for reusable packaging that is useful in displaying products purchased and in carrying the product purchased after the purchase.

SUMMARY OF THE INVENTION

It is an object of this invention to provide a reusable display package that comprises a first body having a first pocket, a second body having a second pocket, a hinge connecting said first body to said second body for moving said first body relative to said second body from an open display position to a closed carrying position, and wherein in said open display position said first and second bodies are substantially coplanar and said first and second pockets mutually confront each other to display the product.

In another embodiment of the present invention a reusable display package is provided that comprises a first body, a second body, a hinge connecting the first body to the second body for moving the first body relative to the second body from an open display position to a closed carrying position, a retaining member removably attached to at least one of the first body, the second body, and the hinge for holding the first body in the open display position, and wherein removing the retaining member permits movement of the first body relative to the second body from the open display position to the closed carrying position.

In yet another embodiment of the present invention a reusable display package is provided that comprises a first body having a first pocket, a second body having a second pocket and at least one product retention member, a hinge connecting the first body to the second body for moving the first body relative to the second body from an open display position to a closed carrying position, wherein in the open display position the first and second bodies are coplanar and said pockets mutually confront each other, wherein the product is displayed in the open position by removably attaching it to the retention member of the second body, and wherein in the closed carrying position the first and second bodies are substantially parallel and said pockets are adjacent each other for carrying the product.

Finally, an embodiment of the present invention provides a folding, reusable package used for both the retail display as well as the post purchase storage of retail consumer products. The package includes top and bottom body portions interconnected by a central living hinge. Additionally, the body portions are interconnected by removable tabs or other features on either side of the previously mentioned living hinge that are intended to prevent the living hinge from bending or folding, thus holding the packaging in a rigid, flat configuration. The top and bottom body portions each include a flat area to which products can be mounted as well as a pocketed area open both on the back and on the side closest the living hinge. The flat areas may include product specific recesses, holes and protrusions provided for holding/storing the product. The pocketed areas can be configured such as to form one large pocket when the body portions are folded. Closure mechanisms can be formed in both the top and bottom body portions and are engageable in a snapping, semi-permanent relationship when the body portions are folded into their 'for storage' configuration. Both top and bottom portions may include handle holes that are aligned with each other when the packaging is in its folded position thus allowing the package to be carried or hung on a peg, nail, hook or other protuberance.

DESCRIPTION OF THE DRAWINGS

Objects and advantages together with the operation of the invention may be better understood by reference to the following detailed description taken in connection with the following illustrations, wherein.

DETAILED DESCRIPTION

Figure 1:
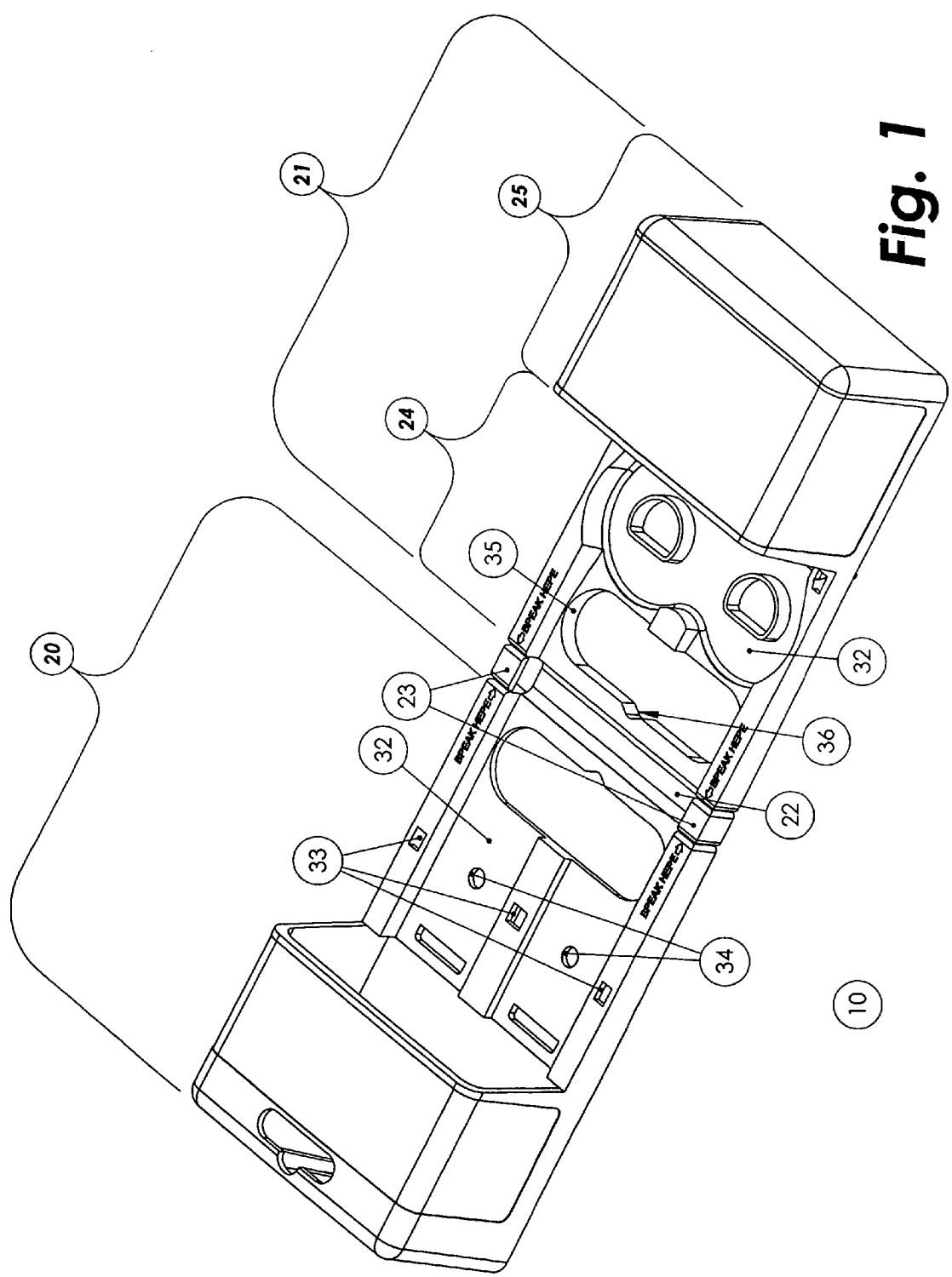
FIG. 1 is a diagrammatical top view of an embodiment of a reusable display package of the present invention in an open position.

FIGS. 1 through 5 illustrate and depict one exemplary embodiment according to the present invention, wherein a reusable display package 10 is adapted for holding, storing and displaying a variety of retail products. One skilled in the art will readily recognize that the folding, reusable display package 10 is shown merely for purposes of example and that the principles of the present invention are equally applicable to display and reusable storage packages of other shapes, sizes, and configurations than that shown in the drawings.

The folding, reusable display and article storage package 10 includes a first body 20 and a second body 21 connected by a hinge 22, such as the living hinge shown in the drawings. It should be understood, however, that the present invention is not limited to the living hinge shown in the drawings. Other hinges and similar devices can be used. The hinge 22 connects the first body 20 to the second body 21 to allow the first body 20 to fold relative to the second body 21 from the open display position shown in FIGS. 1 and 2 to the closed carrying position shown in FIG. 3.

Figure 2:
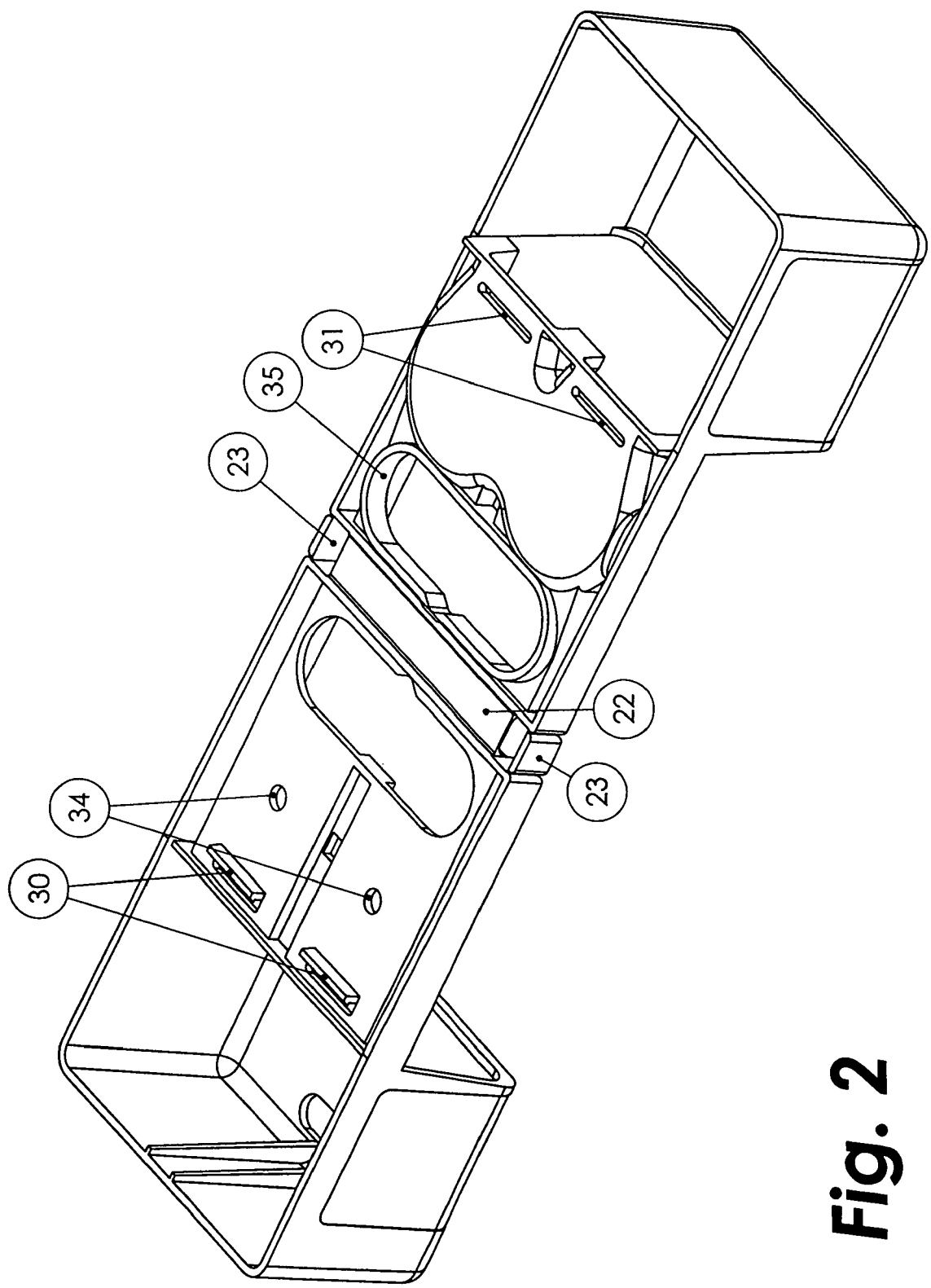
FIG. 2 is diagrammatical bottom view of an embodiment of the reusable display package of the present invention in the open position.

Additionally, a retaining member 23 is removably attached to the hinge 22, the first body 20, the second body 21, or some combination thereof. The retaining member 23 holds the first body 20 in the open display position by preventing movement of the first body 20 relative to the second body 21. The retaining member 23 can include removable or frangible tabs shown in the drawings. In such embodiment, the tabs shown are located on either side of the hinge 22. The retaining member 23 could also include a removable tab (or any other number of tabs) connected to the first body 20, the second body 21, or both. In that situation, the tab or tabs will be connected to the back portion of the first body 20 or second body 21 and will be removable therefrom. All of the embodiments above allow the packaging 10 to remain in the open display position, such as may be preferred for product display at the retail level or for shipping purposes, as shown in FIGS. 1 and 2. As shown in FIGS. 1 and 2, in the open display position, the first and second bodies 20, 21 are substantially coplanar with one another.

To move or fold the first body 20 relative to the second body 21 to the closed carrying position, the tabs 23 are intentionally removed. Of course it will be appreciated, the reusable display packaging 10 may incorporate any means of easily severing the two halves at the center, not just the removable tabs 23 shown. For example, the tabs 23 may be frangible so that a user need only break the tabs to allow the first body 20 to fold onto the second body 21. Further, in lieu of folding any other means that would allow the reusable packaging to assume the closed carrying position shown in FIG. 3 from the open display position shown in FIGS. 1 and 2 can be used. For example, the hinge is not limited to a living hinge. It may be any sort of hinge or hinging mechanism.

Figure 5:
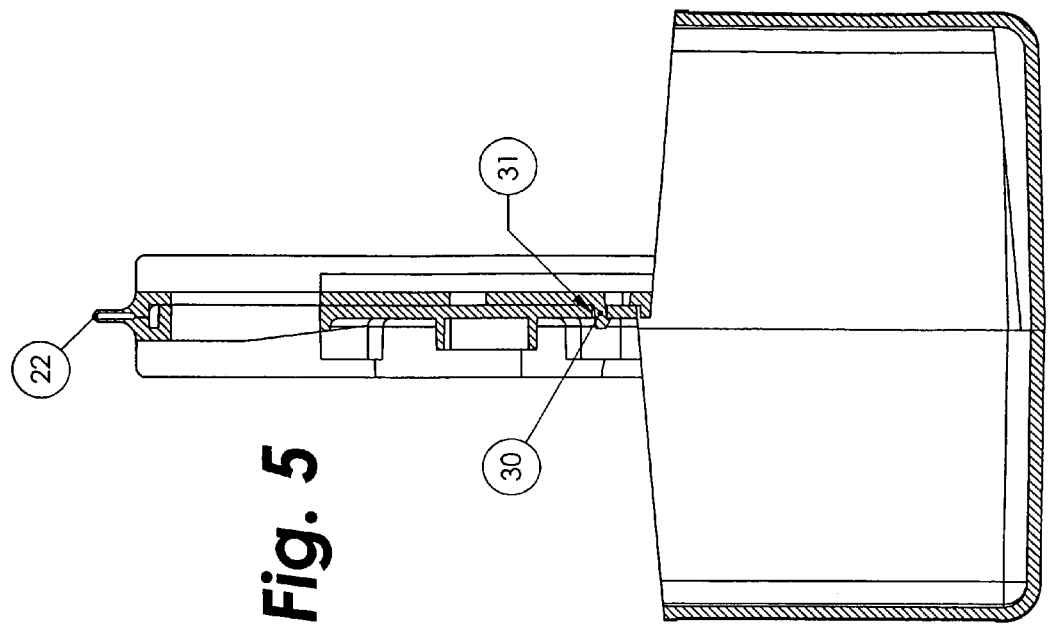
FIG. 5 is a diagrammatical view of an embodiment of the reusable display package of the present invention along lines 5-5.
Figure 4:
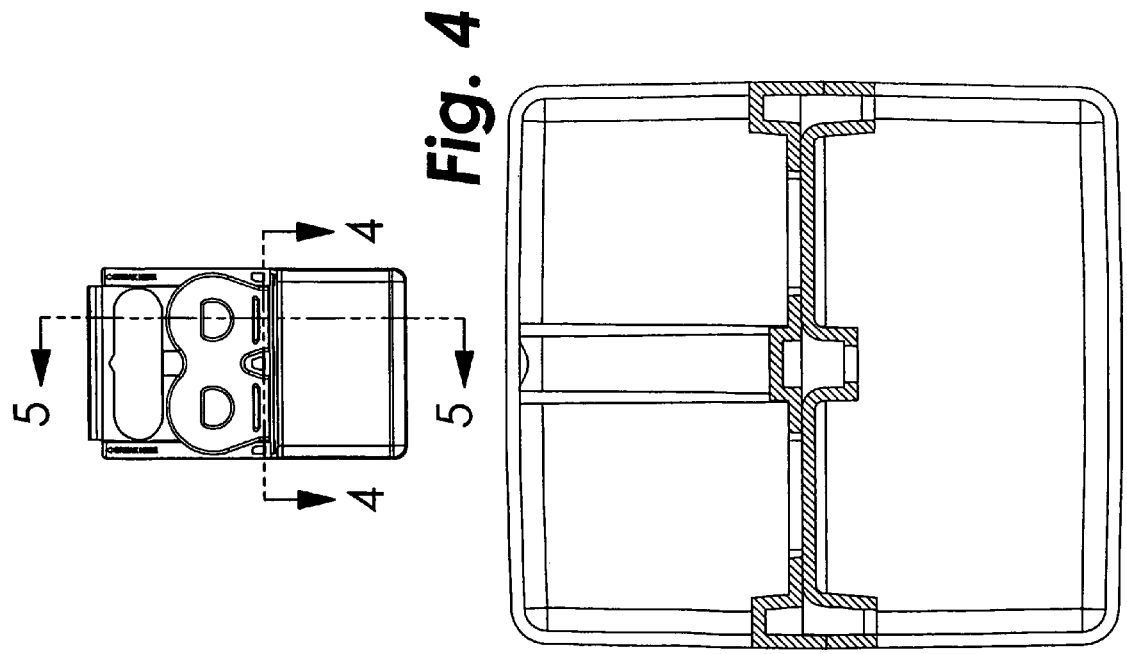
FIG. 4 is a diagrammatical view of an embodiment of the reusable display package of the present invention along lines 4-4.

Closure hooks 30 are formed in the first body 20 with complementary closure slots 31 being formed in the second body 21 as shown in FIGS. 2 and 5 of the exemplary embodiment of the invention. Thus, once the removable tabs 23 are removed and the package 10 is folded, the hooks 30 can be forced through the slots 31 holding the package 10 in the closed carrying position shown in FIG. 3. Of course, it will be appreciated that numerous other means of maintaining the closed carrying position once the display package 10 is folded may be present in lieu, or in addition to, that which is identified above and in FIGS. 1-5.

Figure 3:
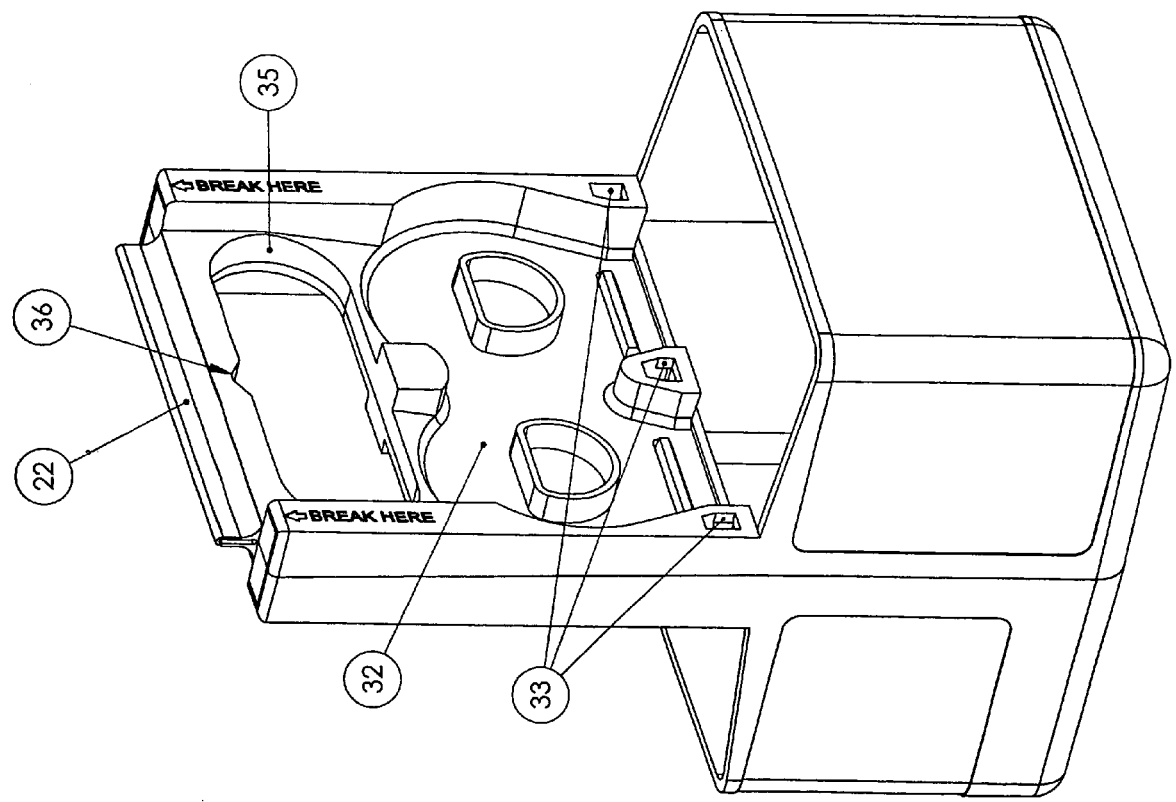
FIG. 3 is diagrammatical side view of an embodiment of the reusable display package of the present invention in a closed position.

Both the first 20 and second 21 bodies may include pockets 25 as well as generally flat, rectangular portion 24. The reusable display and article storage package 10 is intended to be able to stand unassisted on any relatively flat, level surface in either its flat (as shown in FIG. 1) or folded (as shown in FIG. 3) configuration. The exemplary embodiment accomplishes this by means of a bottom surface of the pockets 25 that is relatively perpendicular to the back surface of the package 10 when the package 10 is in its closed carrying position (see FIG. 3). In the open display position, on the other hand, the pockets 25 of the first and second bodies 20, 21 mutually confront each other. That is the openings of each such pocket 25 confront the opening of the other. This allows products to be easily display and held in the package 10.

The flat rectangular portion 24, may include product specific recesses 32 as well as other features, such as a product retention member 33, and a package holding member 34 to facilitate the fastening of product(s) thereto. These other features may include, but are not limited to, openings for the use of cable or zip ties 33 and holes for the use of bolts and/or screws 34. Of course, it will be appreciated that other means of holding a product to package 10 may be used. As can be seen in FIGS. 1-3, the first 20 and second 21 bodies may include handle cutouts 35 with hanger dimples 36 that are aligned with each other when the display package 10 is in its closed carrying position as shown in FIG. 3 thus allowing the display package 10 to be easily carried or hung on a peg, nail, hook or other external protruding member for either storage or display purposes and multiple such packages to be neatly aligned on such a peg, nail, hook, etc. Of course, it will be appreciated that other means of providing a carrying and/or hanging handle may be present than that identified above and in FIGS. 1-5.

The hollow, box-like protrusion or pocket 25 is shown open on two of the six sides. The rear, open side of the first body's 20 hollow, box-like protrusion or pocket 25 is adjacent to and aligned with the rear, open side of the second body's 21 hollow, box-like protrusion or pocket 25 when the display packaging 10 is in the closed carrying position as shown in FIG. 3. Further, as shown in FIG. 3, the first and second bodies 20, 21 are substantially parallel to each other. This creates one large cavity with access openings on either side of the common flat rectangular areas 24. Of course, it will be appreciated that box-like protrusions or pockets may have an inner wall such that when folded two cavities will be created. With additional walls, box-like protrusions 25 may be further divided into any number of such cavities. However, when the package 10 is in the open display position said pockets 25 of said first and second bodies 20, 21 are mutually confronting each other in order to display the products in the package 10. In the open display position, the product can be inserted and held in the pockets 25 of both the first and second bodies 20, 21, or may be held in just one of the pockets 25. Alternatively, the product can be attached to the second body by using the retention members 33. In the embodiment shown, the user can insert a cable tie through the retention members 33, around the product, and then attach the tie together. Doing so will permit the product to be retained without having to necessarily use both pockets 25, or even possibly one of the pockets 25.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention. The dimensions shown in some of the accompanying drawings are similarly for illustrative purposes only. Illustrated packaging 10 may be useful for display and later storage of single or multiple cargo or motorcycle tie-down straps. Such products can be held in the display configuration (either flat or folded—FIG. 1 or 3) such that a consumer may actually touch the products to feel the quality of the components and can be held in the box protrusions 25 of the storage configuration (FIG. 3) of packaging 10 neatly when such products are being stored. Of course, any other number of possible products may also be used with the inventive packaging 10 and this one mentioned use is not meant to the exhaustive or otherwise limiting on the present invention.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. A reusable display package for displaying a product, said package comprising:
    a first body having a first pocket, said first pocket having an opening;
    a second body having a second pocket, said second pocket having an opening;
    a hinge connecting said first body to said second body for moving said first body relative to said second body from an open display position to a closed carrying position;
    wherein in said open display position said first and second bodies are substantially coplanar and said openings of said first and second pockets mutually confront each other to display the product; and
    wherein in said closed carrying position said first and second bodies are substantially parallel and said first and second pockets are adjacent each other to form a single third pocket and further wherein in said closed carrying position, the openings of said first and second pockets are accessible from an exterior of the single third pocket without moving the first body or the second body from the closed carrying position.

2. The reusable display package of claim 1, further comprising a retaining member removably attached to at least one of said first body, said second body, and said hinge for holding said first body in said open display position.

3. The reusable display package of claim 2, wherein removing said retaining member permits moving said first body relative to said second body from said open display position to said closed carrying position.

4. The reusable display package of claim 3, wherein said retaining member comprises a pair of tabs located on said hinge.

5. The reusable display packaging of claim 4, wherein said first and second bodies further include product specific recesses.

6. The reusable display packaging of claim 5, wherein said first and second bodies further include a product retention member for holding the product in said open display position.

7. The reusable display packaging of claim 6, wherein said product retention member comprises at least one opening for a tie.

8. The reusable display packaging of claim 7, wherein said first and second bodies further include handle cut-outs such that in said carrying closed position said handle cut-outs create a handle for carrying.

9. The reusable display package of claim 8, wherein said handle cut-outs include a hanger dimple for hanging said package in said closed carrying position.

10. The reusable display package of claim 1, wherein at the closed carrying position the package can stand unassisted on the first pocket and the second pocket.

11. The reusable display package of claim 1, wherein said hinge is a living hinge integral with said first body and said second body.

12. A reusable display package comprising:
    a first body;
    a second body;
    a living hinge connecting said first body to said second body for moving said first body relative to said second body from an open display position to a closed carrying position wherein said living hinge is integral with said first body and said second body;
    a retaining member removably attached to at least one of said first body, said second body, and said hinge for holding said first body in said open display position; and
    wherein removing said retaining member from at least one of said first body, said second body and said hinge permits movement of said first body relative to said second body from said open display position to said closed carrying position.

13. The reusable display package of claim 12, wherein said retaining member comprises a pair of tabs removably connected to said living hinge.

14. The reusable display package of claim 12, wherein said tab is removably connected to said first body.

15. The reusable display package of claim 12, wherein said tab is removably connected to said second body.

16. A reusable display package for displaying a product, the package comprising:
    a first body having a first pocket, said first pocket having an opening;
    a second body having a second pocket and a product retention member, said second body having an opening;
    a hinge connecting said first body to said second body for moving said first body relative to said second body from an open display position to a closed carrying position;
    wherein in said open display position said first and said second bodies are substantially coplanar and said openings of said first and second pockets mutually confront each other;
    wherein the product is displayed in the open position by removably attaching the product to said product retention member of said second body; and
    wherein in said closed carrying position said first and second bodies are substantially parallel and said pockets are adjacent each other to form a single third pocket for carrying the product.

17. The reusable display package of claim 16, further comprising a pair of tabs removably connected to said hinge for holding said first body in said open display position.

18. The reusable display package of claim 17, wherein said product retention member comprises at least one opening for a tie.

* * * * *